United States Patent
Ugawa et al.

(10) Patent No.: US 11,630,293 B2
(45) Date of Patent: Apr. 18, 2023

(54) IMAGING FLOW CYTOMETER

(71) Applicants: ThinkCyte, Inc., Tokyo (JP); The University of Tokyo, Tokyo (JP)

(72) Inventors: Masashi Ugawa, Tokyo (JP); Yoko Kawamura, Tokyo (JP); Sadao Ota, Tokyo (JP)

(73) Assignees: ThinkCyte, Inc., Tokyo (JP); The University of Tokyo, Tokyo (JP)

( * ) Notice: Subject to any disclaimer, the term of this patent is extended or adjusted under 35 U.S.C. 154(b) by 574 days.

(21) Appl. No.: 16/663,182

(22) Filed: Oct. 24, 2019

(65) Prior Publication Data
US 2020/0057289 A1    Feb. 20, 2020

Related U.S. Application Data

(63) Continuation of application No. PCT/JP2018/016584, filed on Apr. 24, 2018.

(30) Foreign Application Priority Data

Apr. 28, 2017    (JP) .............................. JP2017-090798

(51) Int. Cl.
*G02B 21/00* (2006.01)
*G01N 15/14* (2006.01)
(Continued)

(52) U.S. Cl.
CPC ......... *G02B 21/0076* (2013.01); *G01N 15/14* (2013.01); *G02B 21/04* (2013.01); *G02B 21/18* (2013.01)

(58) Field of Classification Search
CPC .... G02B 21/0076; G02B 21/04; G02B 21/18; G02B 21/367; G02B 21/16; G01N 15/14;
(Continued)

(56) References Cited

U.S. PATENT DOCUMENTS 6,249,341 B1    6/2001    Basiji et al.
8,582,203 B2    11/2013   Dunsby
(Continued)

FOREIGN PATENT DOCUMENTS

EP    3264031 A1    1/2018
JP    2004279032 A    10/2004
(Continued)

OTHER PUBLICATIONS

Translation of WO2016136801A1 (Year: 2016).*
(Continued)

*Primary Examiner* — David P Porta
*Assistant Examiner* — Mamadou Faye
(74) *Attorney, Agent, or Firm* — Wilson Sonsini Goodrich & Rosati

(57) ABSTRACT

An imaging flow cytometer includes at least one flow channel through which an observation target flows, a light source which irradiates the flow channel with sheet-like excitation light, an imaging unit which images a specific cross-section of the observation target by imaging fluorescence from the observation target having passed through a position irradiated with the excitation light, and a three-dimensional image generation unit which generates a three-dimensional image of the observation target as a captured image on the basis of a plurality of captured images obtained by cross-sectional imaging by the imaging unit.

20 Claims, 9 Drawing Sheets

(51) Int. Cl.
  *G02B 21/04* (2006.01)
  *G02B 21/18* (2006.01)

(58) Field of Classification Search
  CPC ....... G01N 15/1429; G01N 2015/1006; G01N 15/1434; G01N 15/147; G01N 15/1475; G01N 2015/1445
  See application file for complete search history.

(56) References Cited

U.S. PATENT DOCUMENTS

| | | | |
|---|---|---|---|
| 10,646,160 B2* | 5/2020 | Yelin | A61B 5/489 |
| 2004/0061914 A1* | 4/2004 | Miyawaki | G02B 21/082 359/1 |
| 2014/0353522 A1 | 12/2014 | Wu et al. | |
| 2015/0192767 A1 | 7/2015 | Li et al. | |
| 2016/0327779 A1* | 11/2016 | Hillman | G02B 21/361 |
| 2016/0370266 A1* | 12/2016 | White | G01N 27/44704 |
| 2017/0045437 A1 | 2/2017 | Ishimaru | |
| 2017/0082531 A1* | 3/2017 | Okada | G01N 15/1434 |
| 2018/0251833 A1* | 9/2018 | Daugharthy | C12Q 1/6869 |

FOREIGN PATENT DOCUMENTS

| | | | | |
|---|---|---|---|---|
| JP | 2013167582 A | | 8/2013 | |
| JP | 5534214 B2 | | 6/2014 | |
| WO | WO-2016136801 A1 | * | 9/2016 | ............. G01B 11/00 |
| WO | WO-2018199080 A1 | | 11/2018 | |

OTHER PUBLICATIONS

PCT/JP2018/016584 International Search Report dated Jul. 17, 2018.
JP2019-514527 Decision of Dismissal of Amendment dated Jul. 12, 2022.

* cited by examiner

FIG. 3
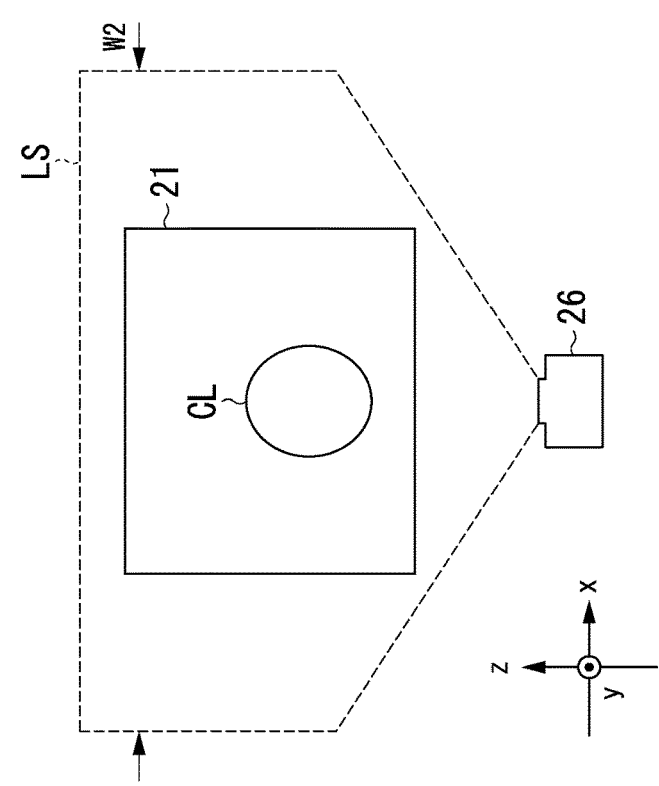
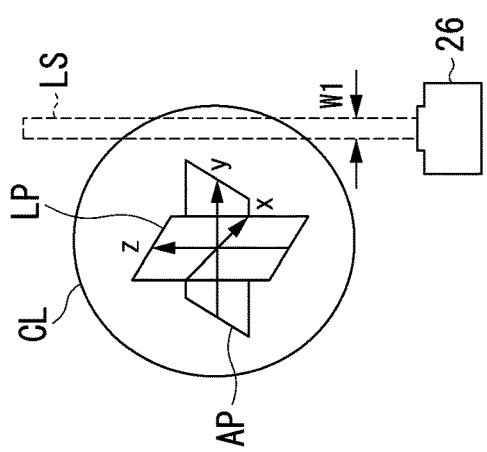
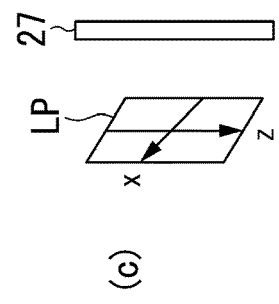

IMAGING FLOW CYTOMETER

CROSS-REFERENCE

The present application is a continuation application of International Application No. PCT/JP2018/016584, filed Apr. 24, 2018, which claims priority to Japanese Patent Application No. 2017-090798, filed on Apr. 28, 2017, each of which is entirely incorporated herein by reference.

TECHNICAL FIELD

The present invention relates to an imaging flow cytometer.

BACKGROUND ART

In the related art, a flow cytometry method for fluorescently staining an observation target and evaluating features of the observation target on the basis of the total amount of fluorescence emission, and a flow cytometer using the flow cytometry method are known (for example, Patent Literature 1). In addition, a fluorescence microscope or an imaging cytometer that evaluate particulates such as cells or bacteria serving as an observation target using an image are known.

In addition, an imaging flow cytometer that captures morphological information of particulates at high speed with the same throughput as a flow cytometer is known (for example, Patent Literature 2). In addition, a multiplane optical microscope that irradiates cells serving as an observation target with sheet-like excitation light to obtain an image of a plane having a different angle with respect to an irradiation plane irradiated with the excitation light and a three-dimensional image of the observation target is known (for example, Patent Literature 3 and Patent Literature 4).

PRIOR ART DOCUMENTS

Patent Documents

[Patent Document 1]
  Japanese Patent No. 5534214
[Patent Document 2]
  U.S. Pat. No. 6,249,341
[Patent Document 3]
  United States Patent Application, Publication No. 2015/0192767
[Patent Document 4]
  U.S. Pat. No. 8,582,203

SUMMARY OF INVENTION

Problems to be Resolved by the Invention

In an imaging flow cytometer of the related art, a two-dimensional image of cells is generated by imaging a plane irradiated with excitation light. However, a method of generating a three-dimensional image of cells under a condition in which cells are observed at high speed using an imaging flow cytometer or the like is not known.

An subject matter of the present invention is to provide an imaging flow cytometer generating a three-dimensional image of an observation target at high speed.

Means for Solving the Problem

An aspect of the present invention provides an imaging flow cytometer including at least one flow channel through which an observation target flows, a light source which irradiates the flow channel with sheet-like excitation light, an imaging unit which images a specific cross-section of the observation target by imaging fluorescence from the observation target having passed through a position irradiated with the excitation light, and a three-dimensional image generation unit which generates a three-dimensional image of the observation target on the basis of a plurality of captured images obtained by imaging the cross-section imaged by the imaging unit.

According to the aspect of the present invention, in the imaging flow cytometer, the observation target may be separated on the basis of information indicating a form of the observation target indicated by the cross-section imaged by the imaging unit.

According to an aspect of the present inventions, in the imaging flow cytometer, a plurality of flow channels are arranged in parallel, the excitation light is irradiated to the plurality of flow channels, and the imaging unit images the cross-section of the observation target flowing through each of the plurality of flow channels.

According to an aspect of the present inventions, in the imaging flow cytometer, a light modulation unit including a plurality of regions having different optical characteristics is disposed on a light path between the light source and an imaging element detecting an intensity of the fluorescence, and the imaging unit reconfigures a cross-sectional image of the observation target as a captured image on the basis of the intensity of the fluorescence detected by the imaging element and the optical characteristics of the light modulation unit.

Advantageous Effects of Invention

According to the present invention, it is possible to provide an imaging flow cytometer that generates a three-dimensional image of an observation target at high speed.

BRIEF DESCRIPTION OF THE DRAWINGS

FIG. 3 is a diagram showing a cross-section of a cell imaged by an imaging element.

DESCRIPTION OF EMBODIMENTS

First Embodiment

Hereinafter, a first embodiment of a cell measurement system will be described with reference to the accompanying drawings.

Figure 1:
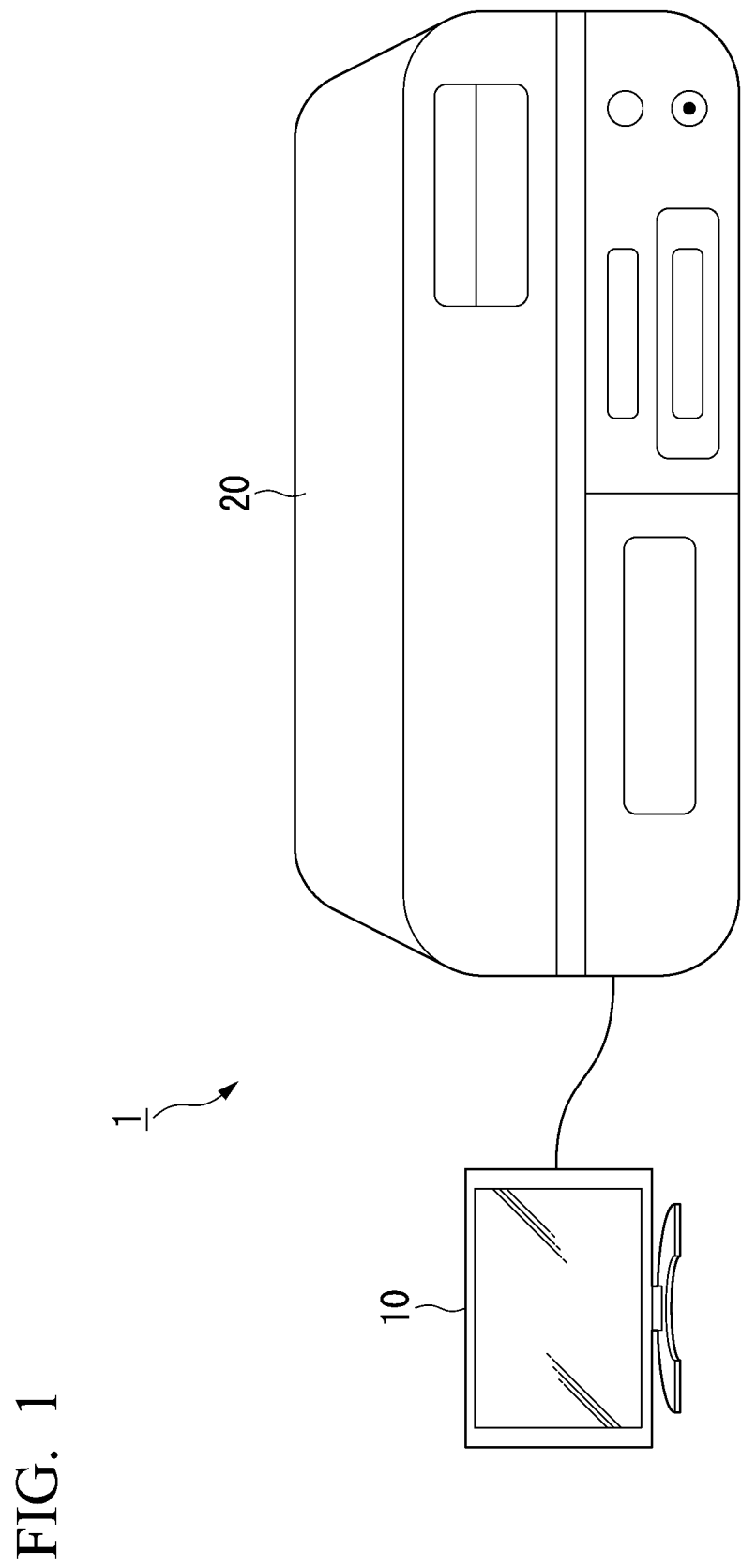
FIG. 1 is a diagram showing an appearance configuration of a cell measurement system.

FIG. 1 is a diagram showing an appearance configuration of a cell measurement system 1.

The cell measurement system 1 includes an imaging flow cytometer 20 and a display unit 10. The imaging flow cytometer 20 includes at least one flow channel through which an observation target flows. It should be noted that although a case where an observation target is a cell is described in the present embodiment, the observation target is not limited to a cell. The observation target may be anything that transmits light. The cell is a fluorescently stained cell.

The imaging flow cytometer 20 generates a three-dimensional image of a cell flowing through the flow channel. The display unit 10 displays a three-dimensional image generated by the imaging flow cytometer 20. The display unit 10 includes, for example, a liquid crystal display and displays various images. The images displayed on the display unit 10 include a three-dimensional image of a cell generated by the imaging flow cytometer 20.

<Functional Configuration of Imaging Flow Cytometer 20>

Next, a functional configuration of the imaging flow cytometer 20 will be described with reference of FIG. 2.

Figure 2:
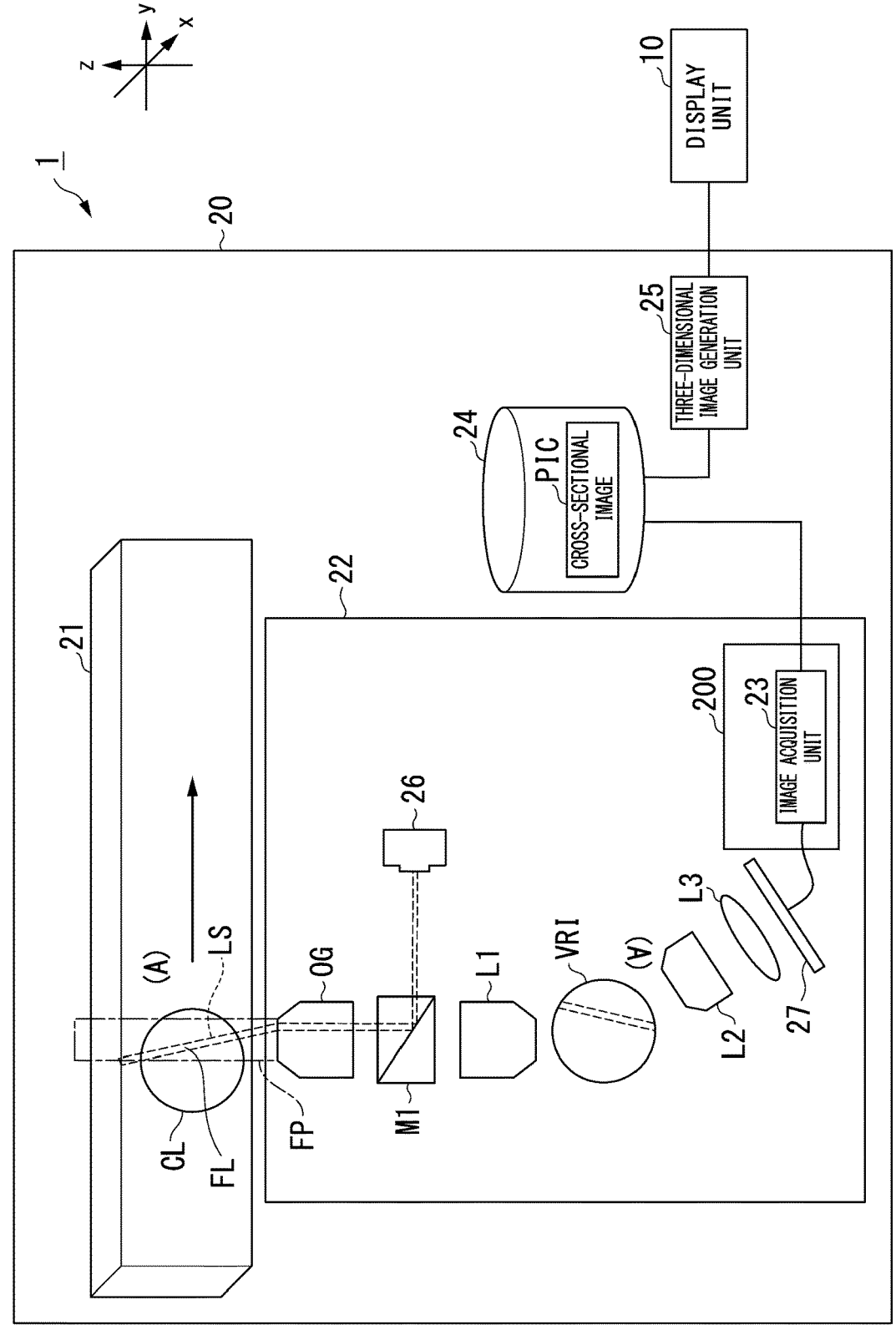
FIG. 2 is a diagram showing an example of a functional configuration of a cell measurement system according to a first embodiment.

FIG. 2 is a diagram showing an example of a functional configuration of the cell measurement system 1 according to the first embodiment.

FIG. 2 shows an xyz coordinate system as a three-dimensional orthogonal coordinate system. In the present embodiment, an x-axis direction is a depth direction of a flow channel 21. In addition, a y-axis direction is a direction in which a cell CL flows in the flow channel 21. The cell CL flows in a +y direction of the y-axis direction. A z-axis direction is a direction orthogonal to the flow channel 21 and is a height direction of the flow channel 21.

The imaging flow cytometer 20 includes an imaging unit 22, a storage unit 24, and a three-dimensional image generation unit 25 in addition to the above-described flow channel 21.

The imaging unit 22 includes a light source 26, an objective lens OG, an imaging element 27, an optical element L1, an optical element L2, an optical element L3, and a control unit 200.

The light source 26 irradiates the flow channel 21 with sheet-like excitation light LS. Specifically, the light source 26 irradiates the flow channel 21 with sheet-like coherent light. The sheet-like excitation light LS is excitation light formed in a sheet shape by narrowing coherent light. The excitation light formed in a sheet shape is coherent light which is adjusted to have a width wider than the diameter of a sample in the x-axis direction and have a thickness thinner than the diameter of the sample in the y-axis direction. In the present embodiment, the light source 26 irradiates the flow channel 21 with the sheet-like excitation light LS through a dichroic mirror M1 and an objective lens OG.

In the following description, the position of the flow channel 21 that is irradiated (irradiated with the excitation light LS) will also be referred to as an irradiation position. The cell CL passing through the irradiation position emits light due to excitation of fluorescent molecules by the excitation light LS. The emitted light is fluorescence FL.

The imaging unit 22 images the fluorescent light FL from the cell CL passing through the position irradiated with the excitation light LS. Thereby, the imaging unit 22 images a specific cross-section of the cell CL. Here, the specific cross-section is a plane on which the fluorescent molecules are excited by the excitation light LS. That is, the specific cross-section is a plane in a direction different from a direction in which the sample flows through the flow channel 21. It should be noted that a configuration of this optical system imaging a specific cross-section of a cell is a configuration disclosed in, for example, United States Patent Application, Publication No. 2015/0192767, U.S. Pat. No. 8,582,203, or the like.

The objective lens OG condenses the fluorescence FL from the cell CL. The objective lens OG is an objective lens disposed at a position where an irradiation position is brought into focus. In the following description, the position where an irradiation position is brought into focus is also referred to as a focal position FP. It should be noted that the objective lens may be a dry objective lens or an immersion objective lens. The immersion objective lens is an oil-immersion lens, a water-immersion lens, or the like.

Fluorescence condensed by the objective lens OG is imaged on the imaging element 27 through the optical element L1, the optical element L2, and the optical element L3. In this example, fluorescence condensed by the objective lens OG is provided as an image VRI through the optical element L1. The image VRI is an image in which the cell CL is reversed in the x-axis direction and the z-axis direction. The imaging element 27 captures the image VRI through the optical element L2 and the optical element L3.

The image formed on the imaging element 27 is a plane in a direction different from the direction of the plane on which the flow channel 21 is irradiated with the excitation light LS. In the present embodiment, the image formed on the imaging element 27 is a plane orthogonal to the irradiation plane of the excitation light LS. This plane is a cross-section of the cell CL.

<Cross-Section>

Here, an example of a cross-section of the cell CL imaged by the imaging element 27 will be described with reference to FIG. 3.

FIG. 3 is a diagram showing a cross-section of the cell CL imaged by the imaging element 27.

FIG. 3(a) is a diagram showing a relationship between the excitation light LS and the position of the cell CL. The excitation light LS emitted from the light source 26 is emitted in the z-axis direction. That is, the excitation light LS is emitted toward plane AP.

FIG. 3(b) is a diagram of the cell CL in FIG. 3(a) seen in the y-axis direction. The excitation light LS spreads in the y-axis direction and the x-axis direction in the form of a sheet. The cell CL flows through the flow channel 21 to pass through the excitation light LS spreading in the form of a sheet. Here, a width W1 of the excitation light LS shown in FIG. 3(a) is narrower than a width W2 of the excitation light LS shown in FIG. 3(b). Specifically, the width W1 is 2 μm to 3 μm.

FIG. 3(c) is a diagram showing a cross-section of the cell CL imaged by the imaging element 27. The imaging element 27 images a plane LP which is a plane orthogonal to the plane AP.

Referring back to FIG. 2, the imaging element 27 images the cross-section of the cell. Here, the imaging element 27 is specifically a line scan camera. The line scan camera acquires an intensity of detected light for each pixel array of the imaging element 27 in the vertical direction or the horizontal direction. The imaging element 27 can acquire only an intensity of light of a pixel array of a region in which an image is formed by using a line scan type imaging element. Thereby, the imaging element 27 can reduce the time for acquiring an intensity of light of a pixel array of a region in which an image is not formed, as compared to imaging elements other than a line scan type imaging element. In addition, it is possible to reduce the time of image processing for generating a captured image on the basis of the intensity of light acquired from the imaging element 27. Thereby, the imaging element 27 can acquire an image at high speed.

In this example, the imaging element 27 is an imaging element constituted by a scientific CMOS (sCMOS), and the like. The sCMOS can perform imaging with higher image quality at a higher speed than an imaging element constituted by a CCD or a CMOS of the related art.

The imaging element 27 supplies a captured image to the image acquisition unit 23.

The control unit 200 includes, for example, a CPU, a graphics processing unit (GPU), a field-programmable gate array (FPGA), and the like, performs various arithmetic operations, and transmits and receives information. The control unit 200 includes the image acquisition unit 23 as a functional unit thereof.

The image acquisition unit 23 acquires a captured image from the imaging element 27. The image acquisition unit 23 stores the captured image acquired from the imaging element 27 in the storage unit 24 as a cross-sectional image PIC. The cross-sectional image PIC is stored in the storage unit 24 in order of imaging.

The three-dimensional image generation unit 25 acquires a plurality of cross-sectional images PIC from the storage unit 24. The three-dimensional image generation unit 25 generates a three-dimensional image of the cell CL on the basis of the plurality of cross-sectional images PIC acquired from the storage unit 24. Specifically, the three-dimensional image generation unit 25 combines the cross-sectional images PIC in the −y-axis direction in order of imaging of the cross-sectional images PIC. The cross-sectional image PIC is an image obtained by imaging the above-described plane LP.

Here, the order in which the three-dimensional image generation unit 25 combines the cross-sectional images PIC will be described in detail with reference to FIG. 4.

Figure 4:
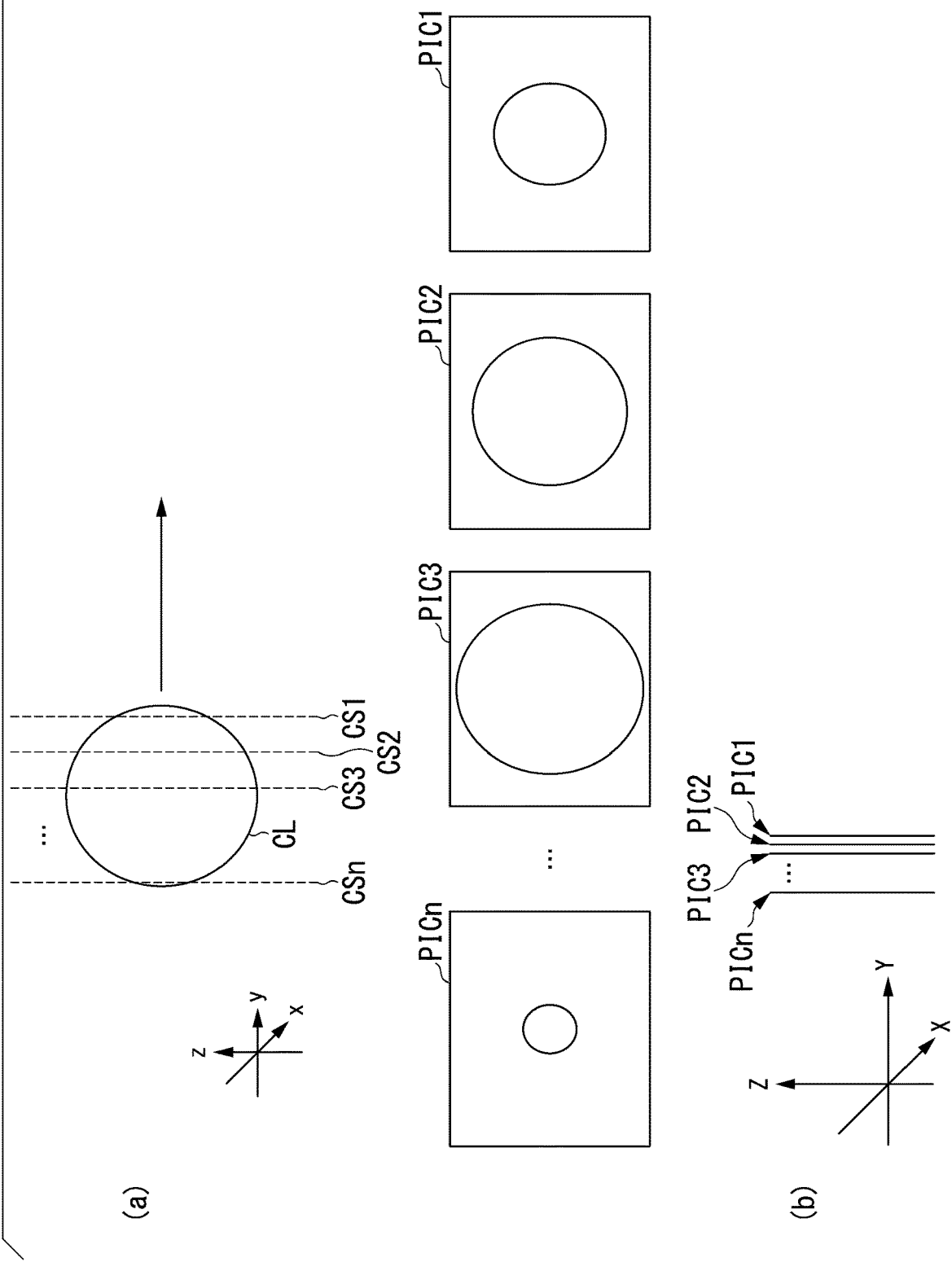
FIG. 4 is a diagram showing the order in which a three-dimensional image generation unit combines cross-sectional images.

FIG. 4 is a diagram showing the order in which the three-dimensional image generation unit 25 combines the cross-sectional images PIC.

FIG. 4(*a*) is a diagram showing an example of a correspondence relationship between a cross-section of the cell CL and a cross-sectional image.

The cell CL moves in the +y-axis direction. The imaging unit 22 captures n cross-sectional images PIC from a cross-section CS1 to a cross-section CSn of the cell CL in order. Here, n of the cross-section CSn is an integer of 1 or greater.

A cross-sectional image PIC1 of the cross-section CS1 to a cross-sectional image PICn of the cross-section CSn are stored in the storage unit 24.

FIG. 4(*b*) is a diagram showing the order in which the three-dimensional image generation unit 25 combines the cross-sectional image PIC1 to the cross-sectional image PICn. The three-dimensional image generation unit 25 combines the cross-sectional images PIC in the −y-axis direction in order of imaging. This is because the cell CL moves in the +y-axis direction. It should be noted that the order of combination is changed depending on a moving direction of the cell CL.

FIG. 4(*b*) shows an XYZ coordinate system as a three-dimensional orthogonal coordinate system. The XYZ coordinate system is a coordinate system of a three-dimensional image generated by the three-dimensional image generation unit 25. The three-dimensional image generation unit 25 combines the cross-sectional image PIC1 to the cross-sectional image PICn in a state where the XYZ coordinate system and an xyz coordinate system are associated with each other. Specifically, the three-dimensional image generation unit 25 combines the cross-sectional images with the X-axis direction and the x-axis direction as the same direction. The three-dimensional image generation unit 25 combines the cross-sectional images with the Y-axis direction and the y-axis direction as the same direction. The three-dimensional image generation unit 25 combines the cross-sectional images with the Z-axis direction and the z-axis direction as the same direction. In addition, the three-dimensional image generation unit 25 combines the cross-sectional image PIC1 to the cross-sectional image PICn in order in the −Y-axis direction to generate a three-dimensional image of the cell CL.

Referring to FIG. 2, the three-dimensional image generation unit 25 displays the generated three-dimensional image of the cell CL on the display unit 10. The display unit 10 displays the three-dimensional image of the cell CL.

<Outline of Operation of Imaging Flow Cytometer 20>

Next, an outline of an operation procedure of the imaging flow cytometer 20 will be described with reference to FIG. 5.

Figure 5:
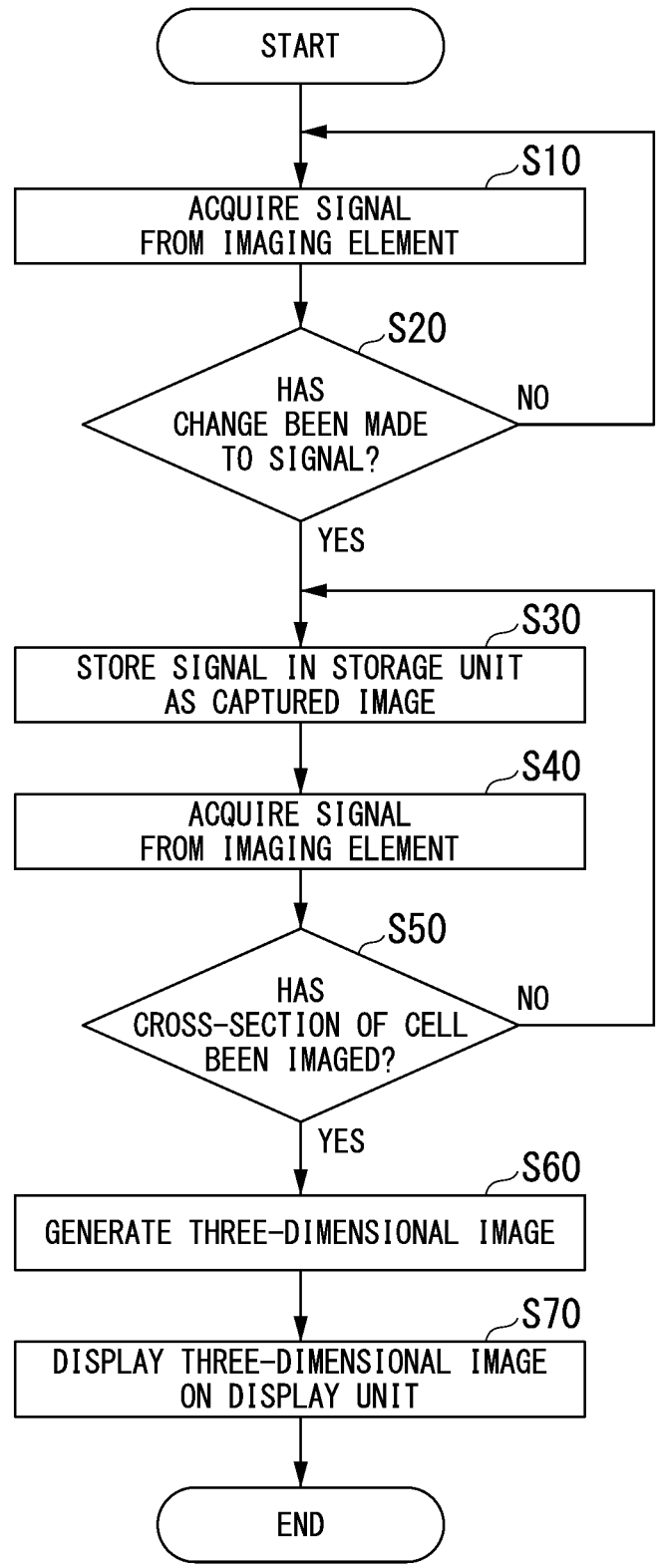
FIG. 5 is a flow diagram showing an example of operation of an imaging flow cytometer.

FIG. 5 is a flow diagram showing an example of operation of the imaging flow cytometer 20. It should be noted that the operation procedure shown here is only an example, it is possible to omit or add an operation procedure.

(Step S10) The imaging element 27 captures an image of the focal position FP at all times. The image acquisition unit 23 acquires a signal from the imaging element 27. The signal is a signal indicating the above-described cross-sectional image PIC.

(Step S20) The image acquisition unit 23 determines whether or not there is a change in the signal acquired from the imaging element 27. Specifically, a signal before detection which is a signal in a state where the cell CL does not flow through a flow channel is stored in the image acquisition unit 23. The image acquisition unit 23 compares the signal before detection with the signal acquired from the imaging element 27. Specifically, in a case where there is no predetermined difference between the signal before detection and the signal acquired from the imaging element 27, the image acquisition unit 23 determines that there is no change in the signal. In a case where there is a predetermined difference between the signal before detection and the signal acquired from the imaging element 27, the image acquisition unit 23 determines that there is a change in the signals.

(Step S20; NO) In a case where it is determined that there is no change in the signal, the image acquisition unit 23 repeats the processing from step S10.

(Step S20; YES) In a case where it is determined that there is a change in the signal, the image acquisition unit 23 stores the signal acquired from the imaging element 27 in the storage unit 24 as the cross-sectional image PIC (step S30).

(Step S40) The image acquisition unit 23 acquires a signal from the imaging element 27.

(Step S50) The image acquisition unit 23 determines whether or not a cross-sectional imaging of the cell CL has been finished on the basis of the signal acquired from the imaging element 27. Specifically, in a case where there is a predetermined difference between the signal before detection and the signal acquired from the imaging element 27, the image acquisition unit 23 determines that a cross-sectional imaging of the cell has not been finished. In a case where there is no predetermined difference between the signal before detection and the signal acquired from the imaging element 27, the image acquisition unit 23 determines that a cross-sectional imaging of the cell has been finished.

(Step S50; NO) In a case where it is determined that a cross-sectional imaging of the cell has not been finished, the image acquisition unit 23 repeats the processing from step S30.

(Step S50; YES) In a case where it is determined that a cross-sectional imaging of the cell has been finished, the image acquisition unit 23 executes the process of step S60.

(Step S60) The three-dimensional image generation unit 25 acquires a plurality of cross-sectional images PIC from the storage unit 24. The three-dimensional image generation unit 25 combines the plurality of cross-sectional images PIC acquired from the storage unit 24 to generate a three-dimensional image.

(Step S70) The three-dimensional image generation unit 25 displays the generated three-dimensional image on the display unit 10. The imaging flow cytometer 20 terminates the processing.

Summary of First Embodiment

As described above, the imaging flow cytometer 20 includes the flow channel 21, the imaging unit 22, and the three-dimensional image generation unit 25. The imaging unit 22 images a cross-section of the cell CL flowing through the flow channel 21 as the cross-sectional image PIC. The three-dimensional image generation unit 25 combines the plurality of cross-sectional images PIC captured by the imaging unit 22 to generate a three-dimensional image. Thereby, the imaging flow cytometer 20 can generate a three-dimensional image of the cell CL.

In addition, the imaging element 27 included in the imaging unit 22 is an imaging element constituted by a sCMOS. The sCMOS can perform imaging at a higher speed than an imaging element constituted by a CMOS or a CCD. The imaging element 27 can capture a large number of images in one second.

In addition, the sCMOS can generate a high-quality captured image with reduced noise as compared to an imaging element constituted by a CMOS or a CCD. Thereby, the imaging flow cytometer 20 can generate a detailed three-dimensional image of the cell CL.

It should be noted that although a configuration in which the imaging unit 22 includes the objective lens OG, the optical element L1, the optical element L2, and the optical element L3 has been described above, the present invention is not limited thereto. The imaging unit 22 may have a configuration disclosed in, for example, United States Patent Application, Publication No. 2015/0192767.

Figure 6:
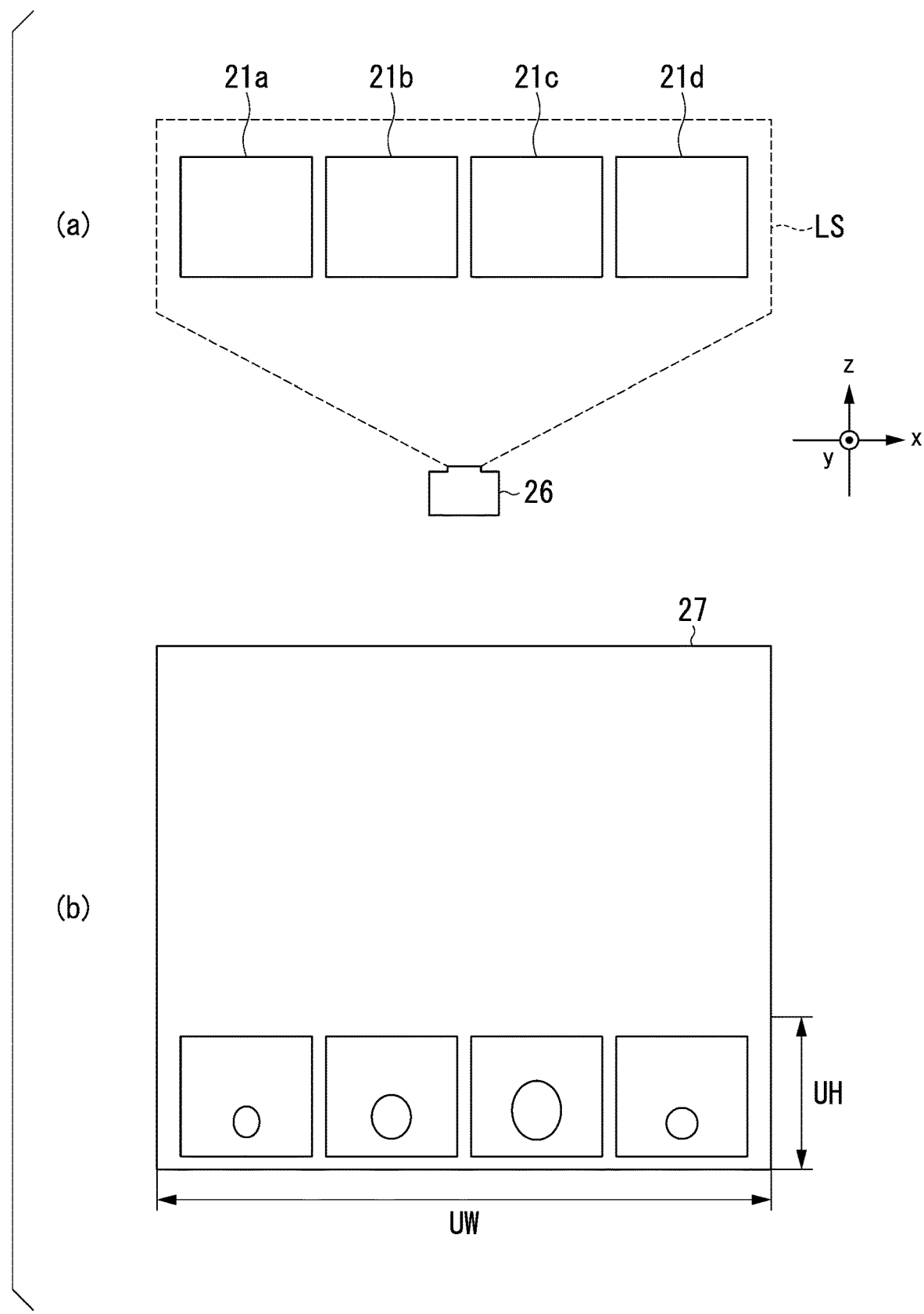
FIG. 6 shows an example of a plurality of flow channels.

It should be noted that as shown in FIG. 6, the flow channel 21 may be a plurality of flow channels arranged in parallel.

FIG. 6 shows an example of a plurality of flow channels.

FIG. 6(a) is a diagram of the plurality of flow channels seen in the y-axis direction.

Flow channels including a flow channel 21a to a flow channel 21d are arranged in parallel in the x-axis direction. The x-axis direction is a depth direction of the flow channel as described above.

The excitation light LS is emitted to the plurality of flow channels 21 from the light source 26. The objective lens OG condenses the fluorescence FL of the cell CL passing through the irradiation position. The imaging unit 22 images a cross-section of the cell CL flowing through the plurality of flow channels. The three-dimensional image generation unit 25 generates a three-dimensional image of the cell flowing to each of the flow channel 21a to the flow channel 21d from the cross-sectional images PIC obtained by imaging cross-sections of the plurality of cells CL.

Thereby, the imaging flow cytometer 20 can generate a cross-sectional image PIC obtained by imaging cross-sections of a plurality of cells CL through one imaging. Thereby, the imaging flow cytometer 20 can increase the number of generated three-dimensional images of cells in accordance with the number of flow channels imaged through one imaging. That is, the imaging flow cytometer 20 can generate a detailed three-dimensional image of the cell CL at a higher speed.

FIG. 6(b) is a diagram showing an example of cross-sections of a plurality of cells CL imaged on the imaging element 27. The cross-sections of the plurality of cells CL are imaged in a range of a width UW and a height UH of the imaging element 27. This range is a portion of a range in which the imaging element 27 can perform imaging.

The image acquisition unit 23 acquires a signal of a pixel included in the width UW and the height UH of the imaging element 27. That is, the image acquisition unit 23 acquires signals of some pixels in the range in which the imaging element 27 can perform imaging. Thereby, the image acquisition unit 23 can acquire a signal from the imaging element 27 at a higher speed than in a case where all of the signals of the pixels included in the imaging element 27 are acquired.

It should be noted that although a case where there are four flow channels 21 is shown in FIG. 6, the present invention is not limited thereto.

Second Embodiment

Next, a second embodiment of an imaging flow cytometer will be described with reference to FIG. 7. It should be noted that the same components and operations as the above-described first embodiment are denoted by the same reference numerals and signs, and the explanatory description thereof will be omitted.

Figure 7:
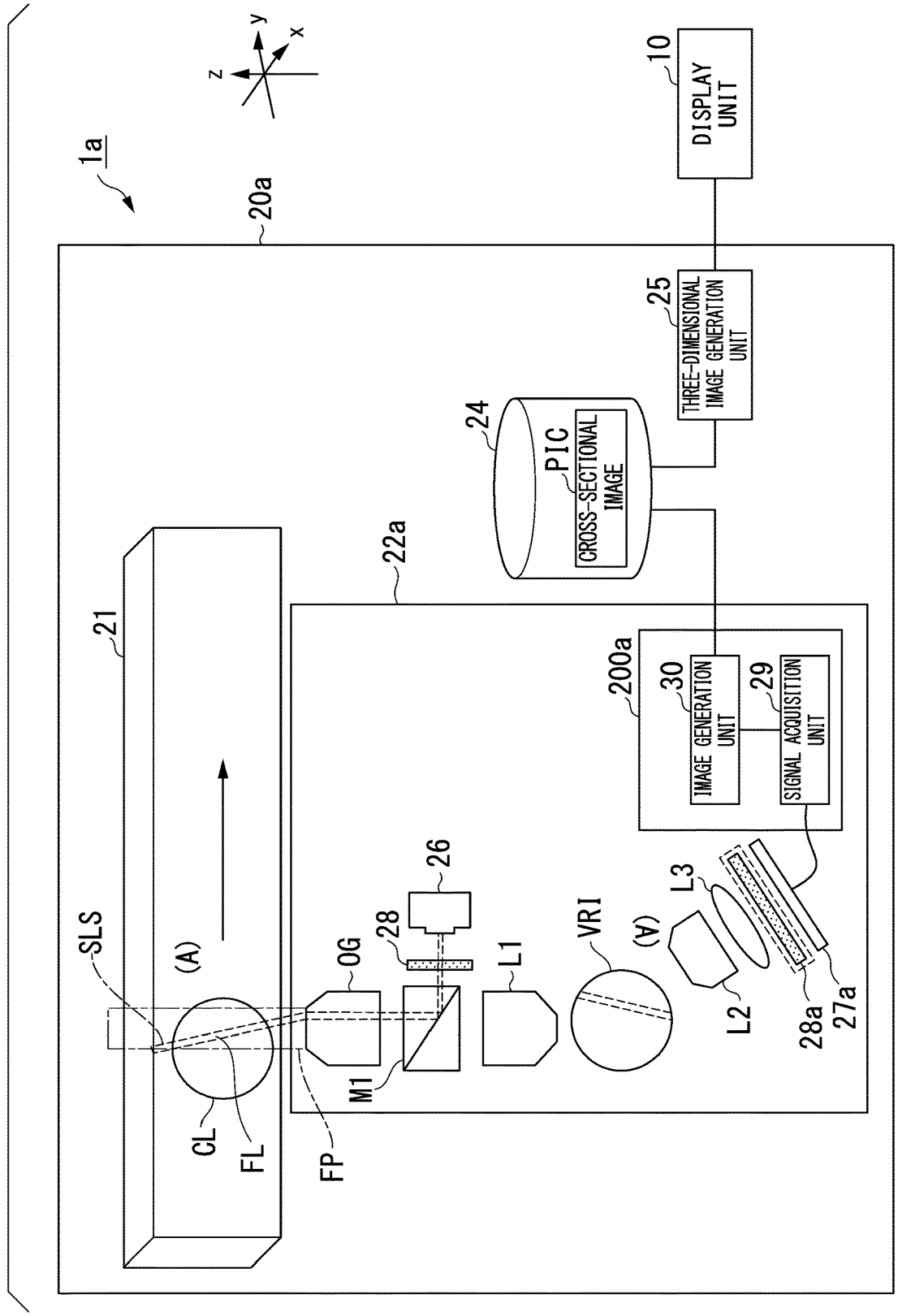
FIG. 7 is a diagram showing an example of a functional configuration of a cell measurement system according to a second embodiment.

FIG. 7 is a diagram showing an example of a functional configuration of a cell measurement system la according to the second embodiment.

The cell measurement system la is different from the above-described first embodiment in that a captured image of a cross-section of a cell CL is generated through compressed sensing. The compressed sensing of the present embodiment refers to reconfiguration of an image of a cross-section of the cell CL based on an intensity of a signal of the fluorescence FL detected by one or a small number of pixel detection elements. It should be noted that a method of reconfiguring a cross-sectional image of the cell CL with respect to a specific cross-section of the cell is disclosed in, for example, PCT International Publication No. WO 2016/136801 and the like.

The imaging flow cytometer 20a includes a light modulation unit 28 and an imaging unit 22a.

The light modulation unit 28 has a plurality of regions having different optical characteristics. The optical characteristics are characteristics related to, for example, any one or more of light transmittance, light intensity, light wavelength, and polarization. It should be noted that the optical characteristics are not limited thereto. The light modulation unit 28 includes, for example, a spatial optical modulator, a film on which a plurality of regions having different optical characteristics are printed, and the like.

The light modulation unit 28 is disposed on a light path between a light source 26 and an imaging element 27a. In the present embodiment, the light modulation unit is disposed between the light source 26 and a dichroic mirror M1 on a light path of excitation light LS emitted to a flow channel 21 from the light source 26. Such a configuration of the disposition is also referred to as a configuration of a structured illumination. The structured illumination irradiates the flow channel 21 with structured excitation light SLS which is structured by the light modulation unit 28. The cell CL flowing through the flow channel 21 emits fluorescence FL by the irradiation with the structured excitation light SLS.

The imaging unit 22a includes an imaging element 27a and a control unit 200a.

The imaging element 27a detects an intensity of the fluorescence FL. The imaging element 27a is, for example, a one-pixel detection element. In the present embodiment, some pixels of the above-described sCMOS are used. The imaging element 27a supplies light-intensity information indicating an intensity of the detected fluorescence FL to a signal acquisition unit 29.

The control unit 200a includes, for example, a CPU, a GPU, a FPGA, and the like, performs various arithmetic operations, and transmits and receives information. The control unit 200a includes the signal acquisition unit 29 and an image generation unit 30 as functional units thereof.

The signal acquisition unit 29 acquires light-intensity information from the imaging element 27a. The signal acquisition unit 29 stores the light-intensity information acquired from the imaging element 27a in time series in order of acquisition. The signal acquisition unit 29 supplies the light-intensity information arranged in time series to the image generation unit 30.

The image generation unit 30 reconfigures a cross-sectional image of the cell CL as a cross-sectional image PIC on the basis of the intensity of the fluorescence FL detected by the imaging element 27a and optical characteristics of the light modulation unit 28. Specifically, the image generation unit 30 acquires the light-intensity information arranged in time series from the signal acquisition unit 29. The image generation unit 30 reconfigures a cross-sectional image of the cell CL as a cross-sectional image PIC on the basis of the light-intensity information arranged in time series and acquired from the signal acquisition unit 29 and the optical characteristics of the light modulation unit 28.

The image generation unit 30 stores the reconfigured cross-sectional image PIC in the storage unit 24.

The three-dimensional image generation unit 25 generates a three-dimensional image similar to the above-described first embodiment.

<Outline of Operation of Imaging Flow Cytometer 20a>

Next, an outline of operation of the imaging flow cytometer 20a will be described with reference to FIG. 8.

Figure 8:
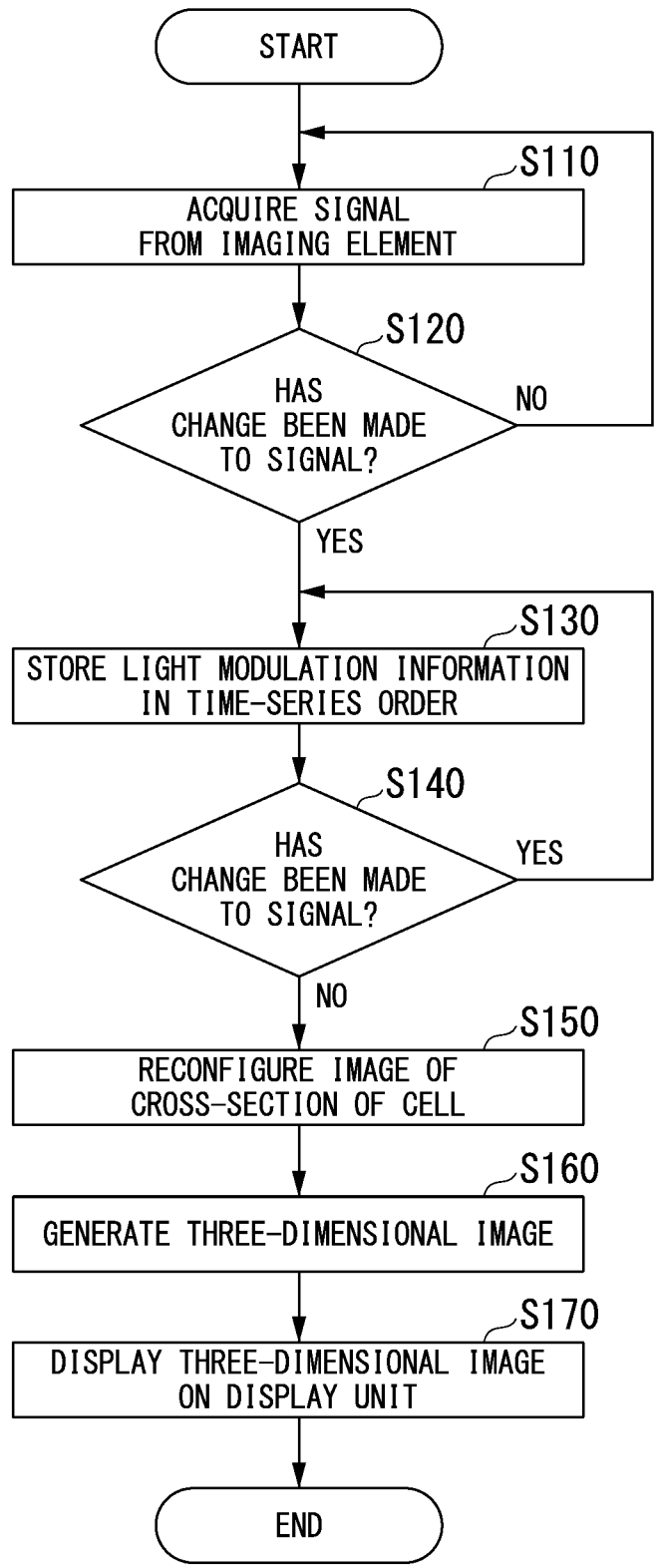
FIG. 8 is a flow diagram showing an example of operation of an imaging flow cytometer.

FIG. 8 is a flow diagram showing an example of operation of the imaging flow cytometer 20a.

It should be noted that although an operation procedure shown here is an example, it is possible to omit or add an operation procedure.

(step S110) The imaging element 27a detects an intensity of the fluorescence FL at all times. The signal acquisition unit 29 acquires a signal indicating the intensity of the fluorescence FL from the imaging element 27a.

(step S120) The signal acquisition unit 29 determines whether or not there is a change in the signal acquired from the imaging element 27a. Specifically, a signal before detection which is a signal in a state where the cell CL does not flow through a flow channel is stored in the signal acquisition unit 29. The signal acquisition unit 29 compares the signal before detection with the signal acquired from the imaging element 27a. Specifically, in a case where there is no predetermined difference between the signal before detection and the signal acquired from the imaging element 27a, the signal acquisition unit 29 determines that there is no change in the signals. In a case where there is a predetermined difference between the signal before detection and the signal acquired from the imaging element 27a, the signal acquisition unit 29 determines that there is a change in the signals.

(step S120; NO) In a case where it is determined that there is no change in the signals, the signal acquisition unit 29 repeats the processing from step S110.

(step S120; YES) In a case where it is determined that there is a change in the signals, the signal acquisition unit 29 stores the signal acquired from the imaging element 27a in time-series order (step S130).

(step S140) The signal acquisition unit 29 acquires a signal from the imaging element 27a. The imaging element 27a determines whether or not there is a change in the signal acquired from the imaging element 27a. This determination is the same as that in the above-described step S120.

(step S140; YES) In a case where it is determined that there is a change in the signal, the signal acquisition unit 29 repeats the processing from step S130.

(step S140; NO) In a case where it is determined that no change has been made to the signal, the signal acquisition unit 29 executes the process of step S150.

(step S150) The signal acquisition unit 29 supplies light-intensity information arranged in time series to the image generation unit 30. The image generation unit 30 acquires the light-intensity information arranged in time series from the signal acquisition unit 29. The image generation unit 30 reconfigures a cross-sectional image of the cell CL as a cross-sectional image PIC on the basis of the light-intensity information arranged in time series and acquired from the signal acquisition unit 29 and the optical characteristics of the light modulation unit 28. The image generation unit 30 stores the reconfigured cross-sectional image PIC in the storage unit 24.

(step S160) The three-dimensional image generation unit 25 acquires a plurality of cross-sectional images PIC from the storage unit 24. The three-dimensional image generation unit 25 combines the cross-sectional images PIC acquired from the storage unit 24 to generate a three-dimensional image.

(step S170) The three-dimensional image generation unit 25 displays the generated three-dimensional image on the display unit 10. The imaging flow cytometer 20a terminates the processing.

Summary of Second Embodiment

As described above, the imaging flow cytometer 20a includes the light modulation unit 28, the signal acquisition unit 29, and the image generation unit 30. The signal acquisition unit 29 stores light-intensity information acquired from the imaging element 27a side by side in time-series order. The image generation unit 30 reconfigures the cross-sectional image PIC including a cross-sectional image of the cell CL on the basis of the light-intensity information stored in the signal acquisition unit 29 and arranged in time-series order and optical characteristics of the light modulation unit 28. The reconfigured image is an image having a width in the y-axis direction. Thereby, the imaging flow cytometer 20a can further reduce the number of times of acquisition of a signal from the imaging element 27a compared with in the above-described first embodiment. The imaging flow cytometer 20a can generate a three-dimensional image at higher speed.

It should be noted that in the above description, although a configuration in which the light modulation unit 28 modulates the excitation light LS has been described, the present invention is not limited thereto. For example, the light modulation unit may be disposed at a position where the fluorescence FL from the cell CL is modulated. For example, the position is the position shown in a light modulation unit 28a of FIG. 7. This position where the light modulation unit 28 is disposed is a position in front of the imaging element 27a on a light path of the fluorescence FL. Regarding the position where the light modulation unit 28 is disposed, a configuration in which the light modulation unit is disposed at a position in front of the imaging element 27a on a light path of the fluorescence FL is also referred to as structured detection.

It should be noted that as described in the first and second embodiments, the control unit 200 and the control unit 200a include a GPU. Thereby, it is possible to further reduce the time required for image processing compared with in a case where image processing is performed using only a CPU. In addition, the control unit 200 and the control unit 200a can perform signal processing using a logic circuit by including an FPGA. Thereby, the control unit 200 and the control unit 200a can further reduce the time required for signal processing compared with a case where signal processing is performed using software. In addition, the FPGA included in each of the control unit 200 and the control unit 200a can change the configuration of the logic circuit used. For this reason, it is possible to change the logic circuit used depending on the type of signal processed by the control unit 200 and the control unit 200a. That is, the imaging flow cytometer 20 and the imaging flow cytometer 20a can observe an observation target at higher speed by changing the logic circuit configuration of the FPGA depending on an observation target.

It should be noted that the imaging flow cytometer 20 and the imaging flow cytometer 20a may sort cells on the basis of a cross-sectional image PIC or a three-dimensional image obtained by imaging the cell CL. That is, the imaging flow cytometer 20 and the imaging flow cytometer 20a may sort cells on the basis of information indicating the morphology of cells included in the cross-sectional image PIC or the three-dimensional image. The sorting refers to separation of predetermined cells among observation targets flowing through the flow channel 21. The predetermined cells may be selected in advance by a user.

Here, sorting will be explained. For example, both a predetermined cell and an object such as dust or another type of cell which is different from the predetermined cell may sometimes flow through the flow channel 21 as observation targets. Selecting and taking out the predetermined cell from the observation targets is sorting.

That is, the imaging flow cytometer 20 and the imaging flow cytometer 20a compare morphological information of a cell selected in advance by a user with morphological information of a cell included in a cross-sectional image PIC or a three-dimensional image to determine whether or not the cells are to be sorted and separate the predetermined cells.

In an imaging flow cytometer of the related art, it takes a lot of time to generate a captured image of a cell. For this reason, in a flow cytometer of the related art, it is not possible to perform sorting on the basis of a captured image. The above-described imaging flow cytometer 20 and imaging flow cytometer 20a can perform sorting because the control unit 200 and the control unit 200a generate a captured image at high speed and perform image processing. In addition, the imaging flow cytometer 20 and the imaging flow cytometer 20a may include a plurality of flow channels 21, and thus it is possible to increase the number of cells CL sorted depending on the number of flow channels.

Here, a configuration in which cells are sorted will be specifically explained with reference to FIG. 9.

Figure 9:
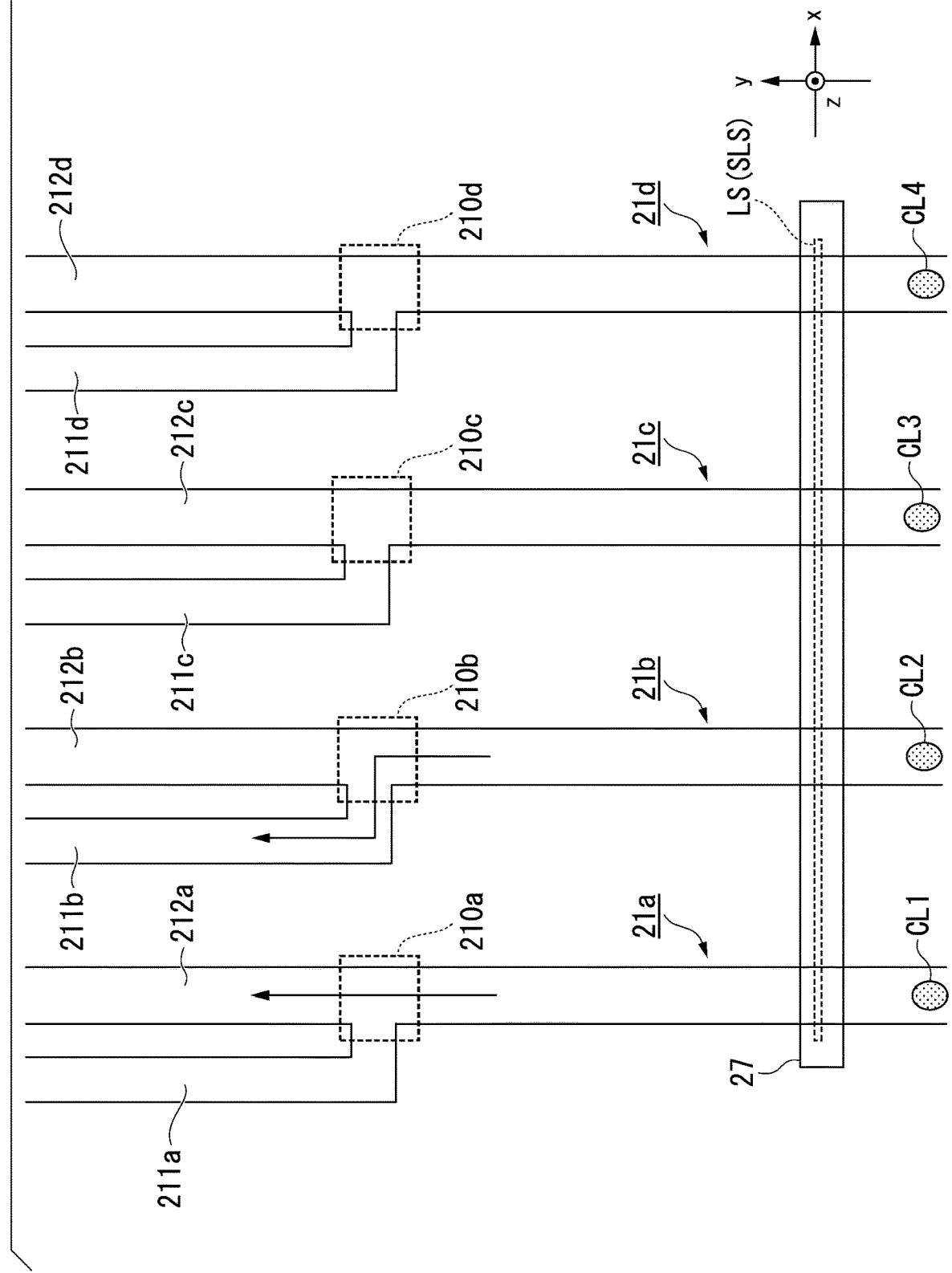
FIG. 9 is a diagram showing an example of a configuration when flow channels sorting cells are seen in a +z-axis direction.

FIG. 9 is a diagram showing an example of a configuration when flow channels sorting cells are seen in the +z-axis direction.

In this example, each of the imaging flow cytometer 20 and the imaging flow cytometer 20a includes a flow channel 21a, a flow channel 21b, a flow channel 21c, and a flow channel 21d. The flow channel 21a, the flow channel 21b, the flow channel 21c, and the flow channel 21d are disposed in parallel in the x-axis direction in this order.

A cell CL1 flows to the flow channel 21a from a − direction of the y-axis direction to a + direction. A cell CL2 flows to the flow channel 21b from a − direction of the y-axis direction to a + direction. A cell CL3 flows to the flow channel 21c from a − direction of the y-axis direction to a + direction. A cell CL4 flows to the flow channel 21d from a − direction of the y-axis direction to a + direction.

The flow channel 21a includes a separation route 211a, an out-of-separation route 212a, and a sorting unit 210a. The flow channel 21b includes a separation route 211b, an out-of-separation route 212b, and a sorting unit 210b. The flow channel 21c includes a separation route 211c, an out-of-separation route 212c, and a sorting unit 210c. The flow channel 21d includes a separation route 211d, an out-of-separation route 212d, and a sorting unit 210d. In the following description, the separation route 211a, the separation route 211b, the separation route 211c, and the separation route 211d are also referred to as a separation route 211 in a case where the separation routes are not distinguished from each other. In addition, in the following description, the out-of-separation route 212a, the out-of-separation route 212b, the out-of-separation route 212c, and the out-of-separation route 212d are also referred to as an out-of-separation route 212 in a case where the out-of-separation routes are not distinguished from each other. Further, in the following description, the sorting unit 210a, the sorting unit 210b, the sorting unit 210c, and the sorting unit 210d are also referred to as a sorting unit 210 in a case where the sorting units are not distinguished from each other.

The separation route 211 is a flow channel through which a cell flows when the cell flowing through the flow channel 21 is a predetermined cell. The out-of-separation route 212 is a flow channel through which a cell flows when the cell flowing through the flow channel 21 is not a predetermined cell. The sorting unit 210 switches a route along which a cell flows from the separation route 211 or the out-of-separation route 212.

In the following description, although the operation of the flow channel 21a will be explained, the operations of the flow channel 21b, the flow channel 21c, and the flow channel 21d are also the same.

The imaging flow cytometer 20 and the imaging flow cytometer 20a image fluorescence FL emitted from the cell CL1 by the excitation light LS using an imaging element 27. The imaging flow cytometer 20 and the imaging flow cytometer 20a determine whether or not the cell CL1 is a predetermined cell on the basis of the imaged fluorescence FL. The imaging flow cytometer 20 and the imaging flow cytometer 20*a* perform determination from when the cell CL1 passes through the excitation light LS to when the cell reaches the sorting unit 210*a*.

In a case where the determination result indicates that the cell is a predetermined cell, the sorting unit 210*a* makes the cell CL1 flow to the separation route 211*a*. In a case where the determination result indicates that the cell is not a predetermined cell, the sorting unit 210*a* makes the cell CL1 flow to the out-of-separation route 212*a*. Thereby, the imaging flow cytometer 20 and the imaging flow cytometer 20*a* can separate the predetermined cell.

As described above, the embodiments of the present invention have been described in detail with reference to the drawings. However, the specific configurations are not limited to these embodiments, and modification can be appropriately made without departing from the scope of the present invention.

It should be noted that the above-described devices include a computer therein. In addition, each of the processing processes of the above-described device is stored in a computer-readable recording medium in a format of a program, and the processing is performed by a computer reading and executing the program. Here, the computer-readable recording medium refers to a magnetic disc, a magneto-optical disc, a CD-ROM, a DVD-ROM, a semiconductor memory, or the like. In addition, the computer program may be distributed to the computer through a communication line, and the computer receiving the program may execute the program.

In addition, the program may realize some of the above-described functions.

Further, the program may be a so-called differential file (differential program) that can be realized by combining the above-described functions with a program recorded in a computer system in advance.

REFERENCE SIGNS LIST 1, 1*a* Cell measurement system
10 Display unit
20, 20*a* Imaging flow cytometer
21, 21*a*, 21*b*, 21*c*, 21*d* Flow channel
22, 22*a* Imaging unit
23 Image acquisition unit
24 Storage unit
25 Three-dimensional image generation unit
26 Light source
27, 27*a* Imaging element
28, 28*a* Light modulation unit
29 Signal acquisition unit
30 Image generation unit
200, 200*a* Control unit
CL Cell
L1, L2, L3 Optical element
OG Objective lens

The invention claimed is:

1. An imaging flow cytometer, comprising:
at least one flow channel configured to permit an observation target to flow therethrough, which observation target comprises a plurality of cross-sections, wherein at least one cross-section of the plurality of cross-sections comprises at least one optically detectable moiety;
a light source in optical communication with the flow channel, wherein the light source is configured to irradiate the at least one flow channel with an excitation light that is sufficient to induce the at least one optically detectable moiety to emit at least one optically detectable signal, wherein the excitation light is configured to spread in a form of a sheet having a width wider than a diameter of the observation target in a first axis direction and a thickness thinner than the observation target in a direction orthogonal to the first axis direction;
an imaging element comprising at least one pixel configured to detect the at least one optically detectable signal emitted by the observation target upon exposure to the excitation light; and
a computer configured to (i) use the at least one optically detectable signal to generate a plurality of cross-sectional images of the observation target, and (ii) use the plurality of cross-sectional images to generate a three-dimensional (3D) image of the observation target.

2. The imaging flow cytometer according to claim 1, wherein the observation target is sorted from one or more objects on the basis of the 3D image or one or more cross-sectional images of the plurality of cross-sectional images.

3. The imaging flow cytometer according to claim 1, wherein the at least one flow channel comprises a plurality of flow channels.

4. The imaging flow cytometer according to claim 1, further comprising a light modulation unit disposed on a light path between the light source and the imaging element.

5. The imaging flow cytometer according to claim 4, wherein the light modulation unit is configured to change an optical characteristic of at least one of the excitation light to the flow channel and the optically detectable signal emitted by the observation target.

6. The imaging flow cytometer according to claim 1, wherein the observation target comprises a cell.

7. The imaging flow cytometer according to claim 1, wherein the sheet-like excitation light comprises coherent light.

8. The imaging flow cytometer according to claim 1, wherein the sheet-like excitation light comprises narrowed coherent light.

9. The imaging flow cytometer according to claim 1, further comprising an objective lens configured to receive and direct the sheet-like excitation light to the flow channel.

10. The imaging flow cytometer according to claim 9, wherein the objective lens is configured to focus the sheet-like excitation light on a cross-section of the plurality of cross-sections.

11. The imaging flow cytometer according to claim 1, wherein the imaging element comprises one or more members selected from the group consisting of: single-pixel detector, line scan camera, and complementary metal oxide semiconductor (sCMOS) camera.

12. The imaging flow cytometer according to claim 3, wherein the plurality of flow channels are arranged in parallel.

13. The imaging flow cytometer according to claim 3, wherein the imaging element is configured to obtain the plurality of cross-sectional images through each flow channel of the plurality of flow channels.

14. The imaging flow cytometer according to claim 4, wherein the light modulation unit comprises a plurality of regions having different optical characteristics.

15. The imaging flow cytometer according to claim 14, wherein the different optical characteristics comprise one or more members selected from the group consisting of: light transmittance, light intensity, light wavelength, and light polarization.

16. The imaging flow cytometer according to claim 1, wherein the excitation light comprises fluorescence excitation light, wherein the at least one optically detectable signal comprises at least one fluorescence signal.

17. A method, comprising:
   (a) permitting an observation target to flow through at least one flow channel, which observation target comprises a plurality of cross-sections, wherein at least one cross-section of the plurality of cross-sections comprises at least one optically detectable moiety;
   (b) irradiating the at least one flow channel with an excitation light that is sufficient to induce the at least one optically detectable moiety to emit at least one optically detectable signal, wherein the excitation light spreads in a form of a sheet having a width wider than a diameter of the observation target in a first axis direction and a thickness thinner than the observation target in a direction orthogonal to the first axis direction;
   (c) detecting the at least one optically detectable signal emitted by the observation target upon exposure to the excitation light;
   (d) using the at least one optically detectable signal to generate a plurality of cross-sectional images of the observation target; and
   (e) using the plurality of cross-sectional images to generate a three-dimensional (3D) image of the observation target.

18. The imaging flow cytometer according to claim 1, wherein the at least one pixel of the imaging element is configured to acquire only an intensity of the at least one optically detectable signal emitted by the observation target.

19. The imaging flow cytometer according to claim 1, wherein the excitation light is a structured light.

20. The imaging flow cytometer according to claim 1, wherein the excitation light is formed in a sheet shape by narrowing coherent light.

* * * * *